(12) United States Patent
Wang et al.

(10) Patent No.: US 10,579,602 B2
(45) Date of Patent: Mar. 3, 2020

(54) ATTRIBUTE REDUNDANCY REMOVAL

(71) Applicant: ORACLE INTERNATIONAL CORPORATION, Redwood Shores, CA (US)

(72) Inventors: Z. Maria Wang, Needham, MA (US); Su-Ming Wu, Waltham, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 73 days.

(21) Appl. No.: 14/068,285

(22) Filed: Oct. 31, 2013

(65) Prior Publication Data

US 2015/0100554 A1    Apr. 9, 2015

Related U.S. Application Data

(60) Provisional application No. 61/887,544, filed on Oct. 7, 2013.

(51) Int. Cl.
 *G06F 16/215* (2019.01)
 *G06F 16/22* (2019.01)

(52) U.S. Cl.
 CPC ........ *G06F 16/215* (2019.01); *G06F 16/2246* (2019.01)

(58) Field of Classification Search
 CPC ......... G06F 17/30067; G06F 17/30489; G06F 3/0641; G06F 3/0608; G06F 9/52
 USPC ....................................................... 707/692
 See application file for complete search history.

(56) References Cited

U.S. PATENT DOCUMENTS

| | | | | |
|---|---|---|---|---|
| 5,799,311 | A * | 8/1998 | Agrawal | G06F 17/30625 707/102 |
| 5,864,839 | A * | 1/1999 | Bourgoin | G06F 16/35 707/E17.087 |
| 6,915,306 | B1 * | 7/2005 | Gong | G06Q 10/087 |
| 7,433,879 | B1 * | 10/2008 | Sharma | G06F 17/30274 |
| 7,603,367 | B1 * | 10/2009 | Kanter | G06F 17/30 |

(Continued)

FOREIGN PATENT DOCUMENTS

| | | |
|---|---|---|
| CN | 103098053 A | 5/2013 |
| CN | 103235803 A | 8/2013 |

(Continued)

OTHER PUBLICATIONS

Patent Cooperation Treaty (PCT) International Search Report and Written Opinion in co-pending PCT International Appl. No. PCT/US2014/055840 (International Filing Date of Sep. 16, 2014) dated Dec. 16, 2014 (8 pgs.).

(Continued)

*Primary Examiner* — Pierre M Vital
*Assistant Examiner* — Andrew N Ho
(74) *Attorney, Agent, or Firm* — Kraguljac Law Group, LLC (57) ABSTRACT

Systems, methods, and other embodiments associated with attribute redundancy removal are described. In one embodiment, a method includes identifying redundant attribute values in a group of attributes that describe two items. The example method also includes generating a pruned group of attributes having the redundant attribute values removed. The similarity of the two items is calculated based, at least in part, on the pruned group of attribute values.

15 Claims, 8 Drawing Sheets

(56) References Cited

U.S. PATENT DOCUMENTS

| | | | | |
|---|---|---|---|---|
| 7,801,924 | B2* | 9/2010 | Thonangi | G06N 20/00 707/797 |
| 7,953,766 | B2* | 5/2011 | Gong | G06Q 10/087 707/736 |
| 8,122,016 | B1* | 2/2012 | Lamba | G06F 17/3053 707/723 |
| 8,250,008 | B1* | 8/2012 | Cao | G06Q 30/02 370/392 |
| 8,417,654 | B1* | 4/2013 | Cao | G06Q 30/02 463/20 |
| 8,649,613 | B1* | 2/2014 | Leung | G06K 9/00724 382/155 |
| 8,660,912 | B1* | 2/2014 | Dandekar | G06Q 30/06 705/26.1 |
| 2001/0042059 | A1* | 11/2001 | Uehara | G06F 17/30595 707/1 |
| 2002/0002550 | A1* | 1/2002 | Berman | G06F 17/30247 |
| 2003/0061213 | A1* | 3/2003 | Yu | G06F 17/30705 707/7 |
| 2004/0181526 | A1* | 9/2004 | Burdick | G06F 17/30598 707/6 |
| 2006/0218169 | A1* | 9/2006 | Steinberg | G06F 17/30598 707/101 |
| 2008/0046474 | A1* | 2/2008 | Sismanis | G06F 17/30306 |
| 2009/0132459 | A1* | 5/2009 | Hicks | G06Q 30/0269 706/52 |
| 2010/0076799 | A1* | 3/2010 | Magent | G06F 19/3437 705/7.31 |
| 2010/0174670 | A1* | 7/2010 | Malik | G06K 9/6219 706/12 |
| 2012/0059790 | A1* | 3/2012 | Clemencon | G06N 5/02 706/55 |
| 2013/0151481 | A1* | 6/2013 | Andrasick | G06F 17/30864 707/692 |

FOREIGN PATENT DOCUMENTS

| | | |
|---|---|---|
| JP | 2011-150591 A | 8/2011 |
| JP | 2011-170778 A | 9/2011 |

OTHER PUBLICATIONS

Anonymous: "How to Prune Dead Branches in a Hierarchical Data Structure", Feb. 20, 2013, pp. 1-2, XP055157206, retrieved from the internet on Dec. 8, 2014 at: URL:http://web.archive.org/web/20130220030648/http://stackoverflow.com/questions/14949236/how-to-prune-dead-branches-in-a-hierarchical-data-structure.

Chinese 1st Office Action in co-pending CN Appl. No. 201480055217.0 (International Filing Date of Apr. 7, 2016) dated Oct. 8, 2018 (8 pgs.).

Zhao Jun-Yang, et al; Feature Subset Selection Based on Max Mutual Information and Max Correlation Entropy; Application Research of Computers, vol. 26, No. 1—Jan. 2009, 1 pg.

How to prune dead branches in a hierarchical data structure, [online], Feb. 20, 2013, [search date: Feb. 23, 2017], Internet: <URL:http://web.archive.org/web/20130220030648/http://stackoverflow.com/questions/14949236/how-to-prune-dead-branches-in-a-hierarchical-data-structure>.

\* cited by examiner

ATTRIBUTE REDUNDANCY REMOVAL

BACKGROUND

Attributes (e.g., size, color, flavor, brand, packaging) describe characteristics and classify items. Corresponding attribute values are presented as descriptive texts for the attributes. For example, the attribute "size" has corresponding attribute values, such as small, medium, or large. Attributes are used in retail analytics applications. In one example, attributes are used to calculate a similarity score, which is a quantifiable approach for evaluating how similar two items are based on their attributes. Similar items typically have a closer sales profile (e.g., rate of sale) than dissimilar items. It can be difficult to identify items that are too similar to one another. There are multiple approaches for identifying items that are too similar. One approach is based on matching attributes for their values, such that the higher the number of identical attribute values between the two items, the greater the similarity of the two items.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Conventional similarity scoring approaches tend to overestimate the similarity of items by not taking into account attribute redundancy. Attribute redundancy includes duplicative attribute values as well as attribute values that do not yield additional information that would help a user distinguish items from one another. In one embodiment, when choosing between two items, some attributes represent true consumer choices while others do not represent a true option available to a consumer. For example, a consumer looking for a vehicle may end up choosing a red sedan. If a sedan only comes in red, the color "red" was not a real option in terms of attributes of the car that was available to the consumer. However, if a truck also comes in red, typical approaches to determining the similarity of two items may overestimate the similarity between a sedan and a truck because both are vehicles that come in red. This is because the typical approaches do not identify that the color of the sedan is not the result of an option available to the consumer and thus not a choice made by the consumer.

One typical approach to remove redundant attributes is to have end users manually "clean" product attributes and create a more logically concise set of attributes and attribute values to use in analytic applications such as a similarity calculation. Such manual approaches may alleviate the problem, but modern systems are too large and complex to approach manually. Requiring such a manual intervention also makes an associated software application prone to error, harder to use, and less robust.

Furthermore, the existing techniques simply evaluate the redundancy between multiple attributes, such as the Chi-Square test or Correspondence Analysis, and do not provide guidance on how to proceed after a pair of attributes has been identified. For example, if a pair of redundant attributes, such as the form and the package of a coffee item, is identified, these methods do not indicate where the redundancy exists within the attribute values of these two. To reiterate, existing techniques do not deal with redundancy among multiple attributes and attribute values. And wholesale removal of entire attributes to alleviate redundancy is likely to be too aggressive, since the attribute may only be partially redundant.

Apparatuses and methods described herein identify redundancy among attributes and/or attribute values that may artificially inflate the similarity of products. The apparatuses and methods described herein provide a way for a retailer or merchant to determine if products are redundant. Returning to the example given above, under conventional similarity analysis, a seller may determine based on the calculated similarity between the sedan and the truck that two vehicles are too similar and are fulfilling the same need. The seller may then decide to stop selling one of them based on the inflated similarity. The current methods would identify the attribute "color" as redundant and the similarity calculation will thus not consider the color when comparing the sedan and the truck.

Figure 1:
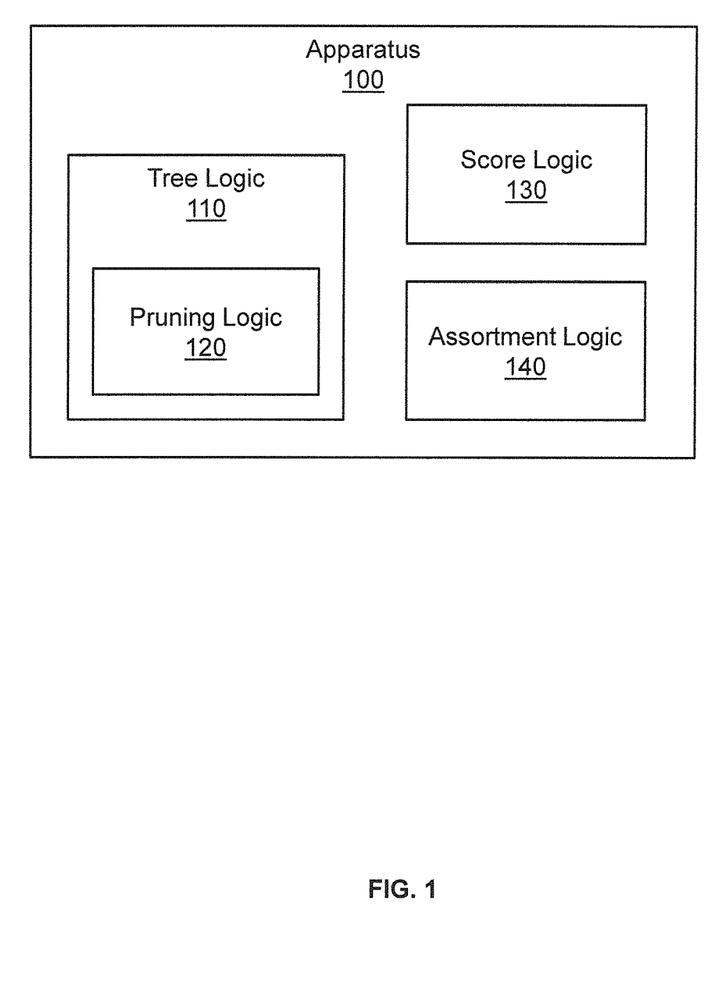
FIG. 1 illustrates one embodiment of an apparatus associated with attribute redundancy removal.

With reference to FIG. 1, one embodiment of an apparatus 100 associated with tree-based attribute redundancy removal is illustrated. The apparatus 100 may be run as software in execution on a computer, an application on a mobile device, or may be launched as an applet from a web page. The apparatus 100 includes a tree logic 110, a score logic 130, and an assortment logic 140. The tree logic 110 further includes a pruning logic 120.

Attributes and their attribute values describe the features of products. In one embodiment, a tree logic 110 receives a plurality of attributes positioned in a tree. The tree can be defined as a collection of attributes starting at a root attribute and extending through branches of children represented as a set of linked attribute values. A parent attribute value is an attribute value that is both linked to the child attribute value and superior to the child attribute value in terms of relevance in describing the underlying item. Children attribute values that share the same parent attribute value are sibling attribute values. The tree represents multiple attributes as a function of the hierarchically arranged attribute values. In another embodiment, the tree logic 110 receives attributes that are categorized, but not in tree form. The tree logic 110 generates a tree based on the categorized attributes and a given attribute importance order. The attribute importance order can be described in numerical weights.

The pruning logic 120 prunes the tree of redundant attribute values. An attribute value is redundant if the attribute value has little or no incremental discriminatory power to differentiate the products by discriminating the parent attribute. Consider a scenario where a parent attribute value in a tree has a single child attribute value. The single child attribute can be pruned from the tree because the child attribute value does not offer additional ability to discriminate the products within the parent attribute value.

Figure 2:
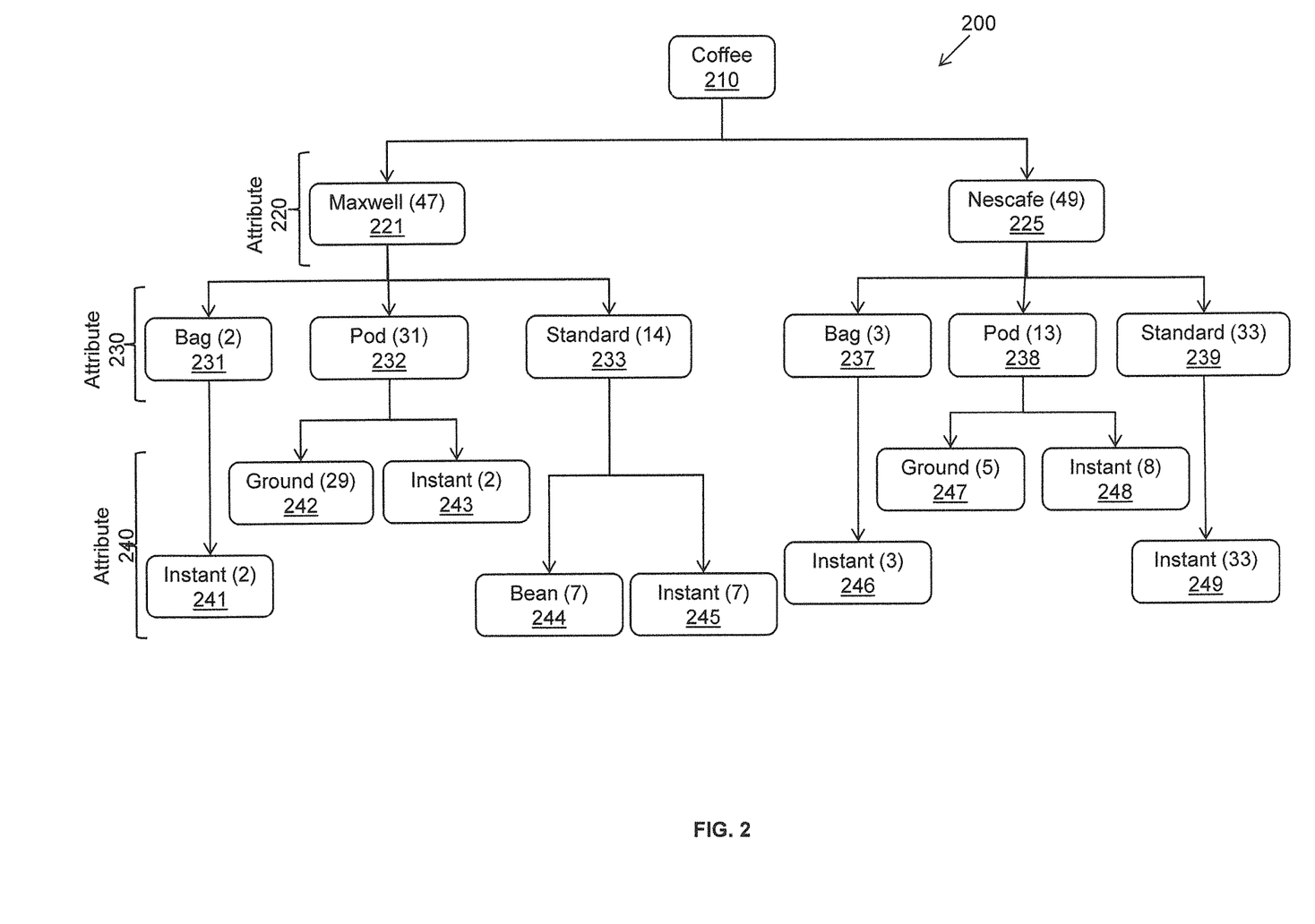
FIG. 2 illustrates an example of a tree that hierarchically arranges various attributes and attribute values of coffee products.

Referring to FIG. 2, an example of a tree for coffee products is illustrated. The tree 200 is a hierarchical representation of product attributes of coffee category. The root 210 of the tree 200 indicates the type of category, specifically, "coffee." Therefore, the tree 200 is a hierarchical representation of coffee attributes. For example, attribute 220 of the tree 200 contains brands Maxwell House® 221 and Nescafe® 225. Attribute 230 contains packaging attributes values (e.g., bag, pod, standard) and attribute 240 contains form attribute values (e.g., bean, ground, instant). The attributes values include the value of the attribute as well as the number of products that are associated with each attribute value. For example, Pod (31) of attribute 232 indicates that one form of Maxwell House® coffee is pod and that there are 31 products of pod packaging for Maxwell House® coffee.

Recall that the pruning logic 120 of FIG. 1 prunes the tree. When a tree is pruned, any attributes that have an insignificant amount of incremental discriminatory power to discern product from the parent attribute in the immediate upper level are removed. As such, an attribute that would not give a user making a decision between items any additional choices is removed. For example, in the tree 200, the attribute value 241 "Instant (2)" would be pruned from the tree because of the fact that the coffee is in instant form does not provide a user any additional choices for bagged coffee. If a consumer wished to purchase a bag of Maxwell House® coffee, purchasing instant coffee would be the consumer's only option. Therefore, the fact that the bagged Maxwell House® coffee is instant would not provide the consumer any additional choices. Accordingly, attribute value 241 does not provide incremental discriminatory power. Consequently, attribute value 241 can be pruned from the tree.

Likewise, attribute values that have a low incremental discriminatory power and do not offer a significant choice between items may also be pruned. For example, attribute value 242 indicates that there are twenty nine products of ground coffee for a pod of Maxwell House®. Attribute value 243 indicates that there are only two products of instant coffee for a pod of Maxwell House®. Therefore, the consumer that chooses to purchase Maxwell House® coffee in a pod is much more likely to purchase the pod with ground coffee since there are twenty-nine products of ground coffee as opposed to the two products of instant coffee. This means that attribute value 243 has insignificant incremental discriminatory power. Accordingly, attribute value 243 may be pruned from the tree due to the incongruence of products as between attributes values 242 (i.e. "Ground") and 243 (e.g., "Instant"). A user may determine what level of incongruence between attribute value should result in pruning.

Returning now to FIG. 1, the pruning logic 120 may prune attribute values based on a redundancy threshold. The redundancy threshold is a predetermined incongruence percentage which is when at least one attribute value comprises significantly fewer products than sibling attribute values do when represented as percentages of the total instances. For example, the pruning logic 120 may be configured to prune child attribute values that have instances representing less than 5% of the total instances of attributes for a parent attribute. Alternatively, a user may set the redundancy threshold used by the pruning logic 120.

In one embodiment, the pruning logic 120 is configured to calculate the incremental discriminatory power of attribute values using classification metrics, such as Entropy or Gini Index. The Entropy classification metric is calculated for a parent attribute value for the discriminatory power of child attribute values. A calculated incremental discriminatory power quantifies the degree to which child attribute values differentiate one product from another product in the parent attribute value. The redundancy threshold of the incremental discriminatory power is set by the user. When the incremental discriminatory power of a parent attribute value is lower than the redundancy threshold, this indicates that the branches from the parent attribute value to the child attribute value(s) are not adding sufficient discriminatory power, and thus, the branch(es) of the child attribute values are redundant and should be pruned from the tree.

The scoring logic 130 computes a similarity score for two items represented by the tree. The scoring logic 130 determines the similarity score based on the pruned tree. The pruned tree does not include redundant attribute values and thus protects the similarity score from being arbitrarily inflated. In one embodiment, the similarity score is a fractional number indicating how alike two items are. For example, items having a similarity score of 75% are more alike than items having a 25% similarity score.

The assortment logic 140 determines if an item should be removed from the assortment of inventory. In one embodiment the similarity score is compared to a similarity threshold. If the similarity score exceeds the similarity threshold the two items are determined to be similar. The assortment logic 140 may mark one of the two items to be removed from the store's inventory assortment, thereby allowing a user to decrease assortment sizes.

Figure 3:
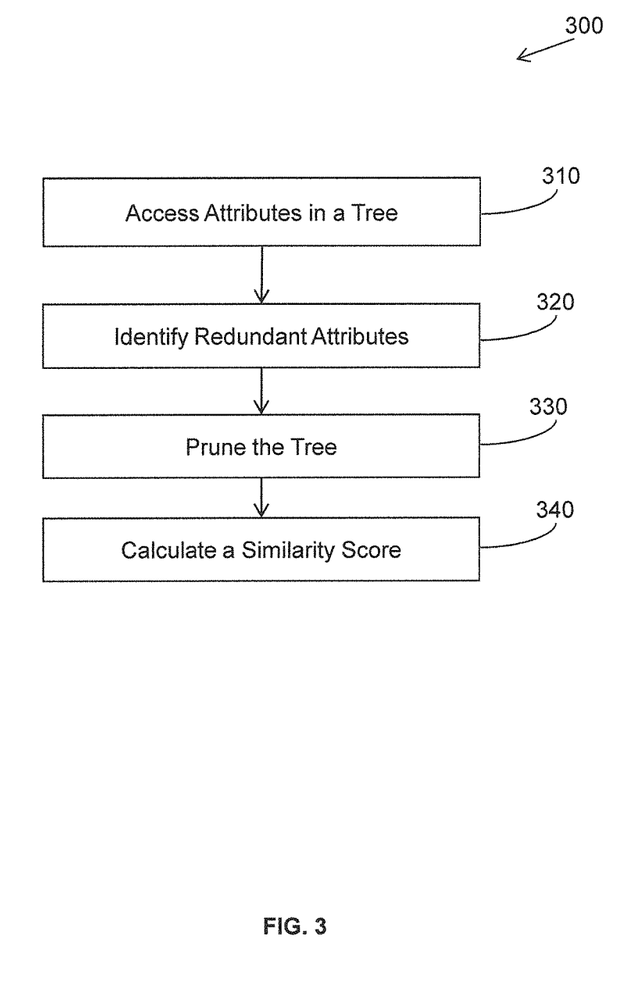
FIG. 3 illustrates one embodiment of a method associated with attribute redundancy removal.

FIG. 3 illustrates a method 300 associated with tree based removal of redundant attribute values. At 310, attributes for at least two items arranged hierarchically in a tree are accessed. In some embodiments, categorized attributes for the two items are received but the attributes are not yet in tree form and the tree must first be determined. For example, the categorized attributes may be received in a table or graphical representation. The received categorized attributes may be weighted. Weighting the attributes indicates the importance of the categorized attributes relative to one another. In this manner, users can indicate preferences for certain attributes. The categorized attributes may be arranged in a tree according to the weights of the attributes. For example, the brand of an item may be considered more important that the packaging of the item. Therefore, brand would be weighted more heavily than packaging. Consequently, when arranging the categorized attributes in the tree, the categorized attributes denoting brand are arranged in a level higher than a level of attributes denoting packaging.

At 320, attribute redundancy in the tree is identified. Redundant attributes and/or attribute values that have less incremental discriminatory power than other attribute values to differentiate items represented in the tree. For example, an attribute value is identified as redundant if the attribute value is the only child of its parent attribute value. This is because a child attribute without a sibling has insignificant power to differentiate. A given attribute may be identified as redundant if its sibling attribute has far more instances than the given attribute does because the attribute with more instances is statistically more likely to be chosen. Therefore, the attribute with significantly less instances has very little incremental discriminatory power. Accordingly, by calculating the incremental discriminatory power, it is determined whether an attribute is redundant.

To calculate the incremental discriminatory power (IV) using the Entropy classification metric the following variables are used: n is the number of child attributes under the parent attribute, c is an attribute value of the attribute at child attribute level, and P(c) is the fraction of items that fall in the child attribute having the attribute value c versus total number of items in the parent attribute, where:

$$IV_i = -\Sigma_{c=1}^n P(c)\ln(P(c))$$

The incremental discriminatory power (IV) can also be calculated using Gini equation where $IV_i = 1 - \Sigma_{c=1}^n [P(c)]^2$ Once the incremental discriminatory power at each parent attribute value is computed, those with an incremental discriminatory power lower than an incongruence percentage threshold will have its child attribute values pruned. The children attribute values are pruned because the parent attribute value's low incremental discriminatory power indicates that branching to the children attribute values from the parent attribute value is not bringing in sufficient information to further differentiate the items in the parent attribute value. Thus, the children attribute values are considered redundant.

At 330, a pruned tree is generated by removing redundant attribute values. At 340, a similarity score is calculated for two items based on the pruned tree. In one embodiment, the similarity score is calculated using a formula for weighted matching coefficient according to:

$$WMC = \frac{\sum_{i=1}^m w_i \cdot f_i}{\sum_{i=1}^m w_i}$$

Where $w_i$ refers to the weight of attribute i, and $f_i$ is the matching factor. The weight, $w_i$, of attributes is received with the attributes and can be applied here. Alternatively, the weights of the attributes may be predetermined or separately calculated. The matching factor, $f_i$, is determined by comparing the attribute values of the two items. If the two items share the same value for the attribute, then a 1 is applied to the value $f_i$. If the two items do not share the same value, a 0 is applied to the value of $f_i$.

Figure 4:
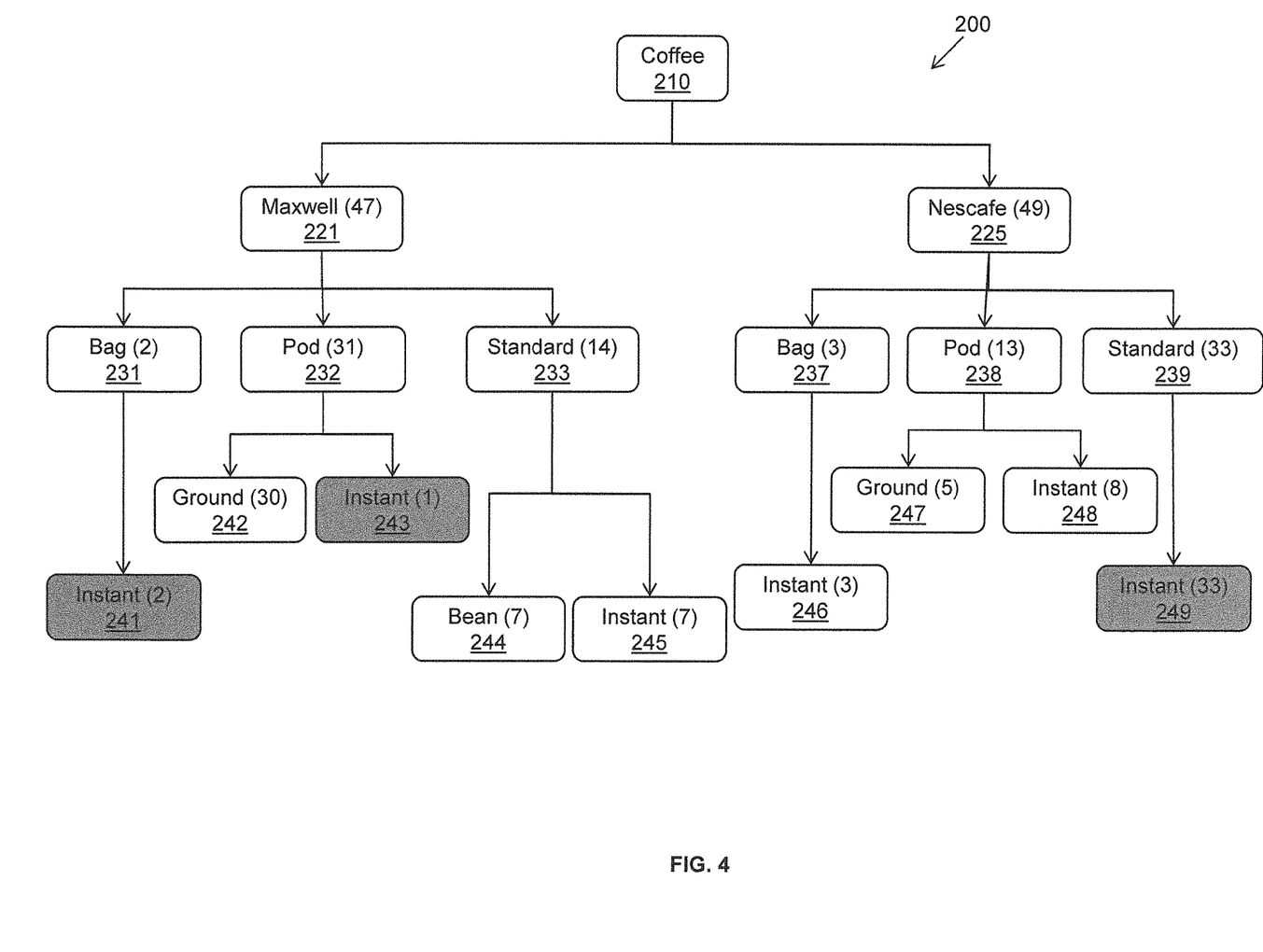
FIG. 4 illustrates the tree of FIG. 2 with redundant attributes identified.

FIG. 4 illustrates an example of the tree 200 that has not yet been pruned but has redundant attribute values shaded. Attribute values 241, 243, and 249 are shaded to indicate that these attribute values do not have adequate incremental discriminatory power. For example, attribute values 241, 243, and 249 do not represent true consumer choices resulting from discrimination between multiple items.

Specifically, attribute value 241 is to be pruned because it is the only child attribute value of parent attribute value 231. Therefore, the fact that it is instant coffee in a bag does not add incremental discriminatory power since a consumer purchasing Maxwell House® coffee in a bag only has the choice of purchasing instant coffee. Also attribute 243 is to be pruned because it has an insignificant number of instances as compared to its sibling attribute value 242. Finally, attribute value 249 is to be pruned because it is the only child attribute value of parent attribute value 239.

Figure 5:
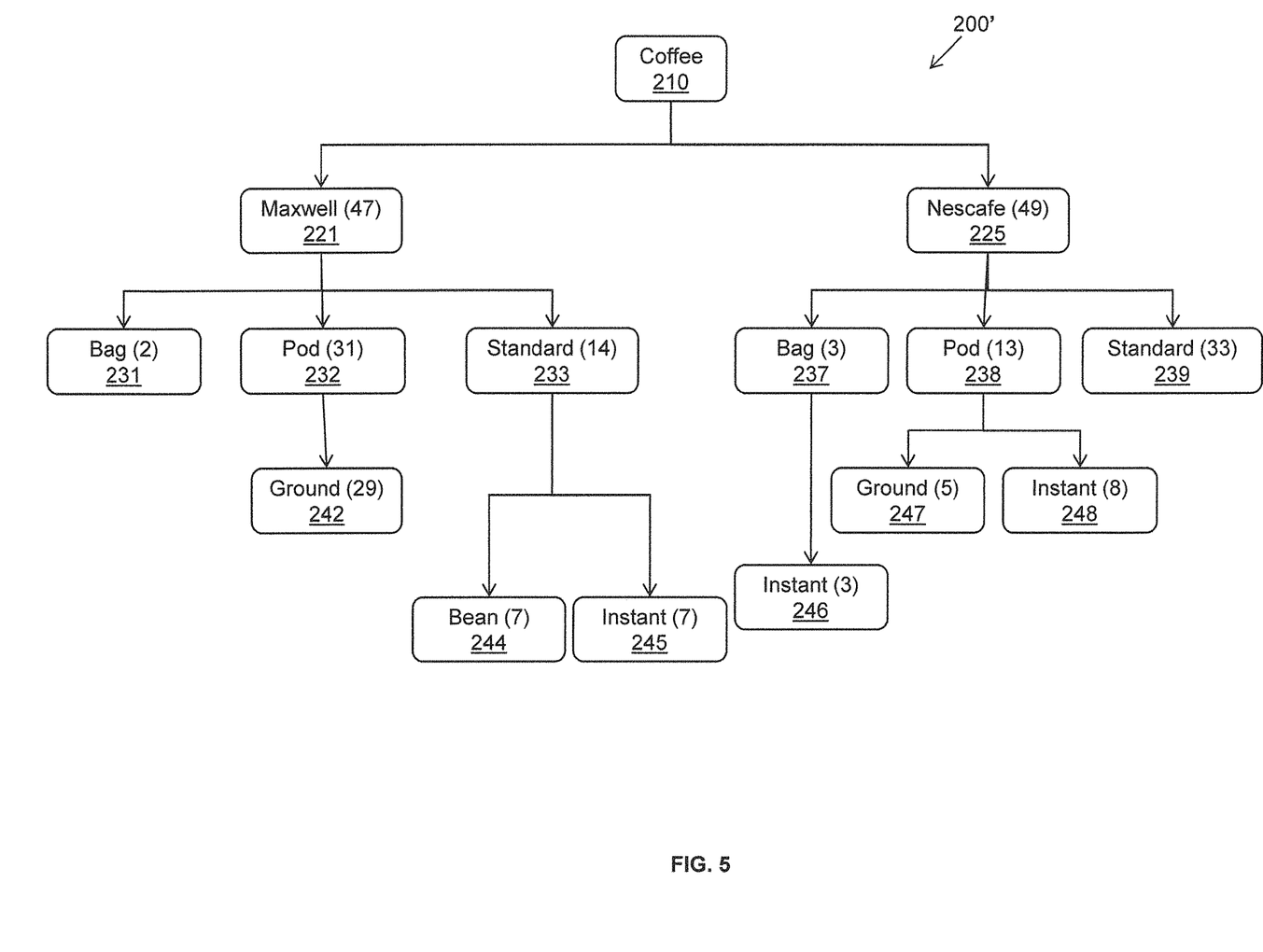
FIG. 5 illustrates the tree of FIG. 2 with redundant attributes pruned away.

FIG. 5 illustrates a pruned version 200' of the tree 200 shown in FIG. 4. The shaded attributes shown in FIG. 4 have been removed from the tree to form the pruned tree. The pruned tree includes only those attribute values that concisely represent the attribute hierarchy by minimizing the number of attributes.

When calculating a similarity score between items the pruned tree is used so that the similarity score does not include redundant attributes that may cause the similarity score to overestimate the similarity of items. For example, using the unpruned tree, a similarity score is calculated between attribute values 241 (Maxwell House®, bagged, instant) and 245 (Maxwell House®, standard, instant). For the purposes of this example, we assume that the brand attribute of the coffee is weighted 50%, the packaging attribute is weighted 30%, and the form attribute is weighted 20%. The similarity score is calculated according to:

$$WMC = \frac{\sum_{i=1}^m w_i \cdot f_i}{\sum_{i=1}^m w_i}$$

When the similarity score is calculated based on the un-pruned tree of FIG. 4, the result is that the items are 70% similar. The brands are the same, the packaging is different, and the forms of the items are the same. Thus:

$$f_1 = 1, f_2 = 0, f_3 = 1. \text{ and } w_1 = 0.5, w_2 = 0.3, w_3 = 0.2, \text{ then}$$

$$\begin{aligned}WMC_{12} &= \frac{w_1 f_1 + w_2 f_2 + w_3 f_3}{w_1 + w_2 + w_3} \\ &= \frac{0.5 \cdot 1 + 0.3 \cdot 0 + 0.2 \cdot 1}{1} \\ &= \frac{0.7}{1} \\ &= 0.7\end{aligned}$$

However, when the similarity score is calculated based on the pruned tree 200' in FIG. 5, the result is that the items are 50% similar. Therefore, based on the pruned tree the calculated similarity between the items is 20% lower. This is because, in accordance with pruned tree, the brands are the same, the packaging is different, and the forms are different. The forms are different based on the pruned tree 200' because while both attribute value 241 and attribute value 245 represent instant coffee, attribute value 241 was removed from the pruned tree 200'. Therefore, when calculating the similarity score using the pruned tree the result is that the items are 50% similar because the brand, weighted 50%, is the same but the packaging and the form are considered to be different.

$$\begin{aligned}WMC_{12} &= \frac{w_1 f_1 + w_2 f_2 + w_3 f_3}{w_1 + w_2 + w_3} \\ &= \frac{0.5 \cdot 1 + 0.3 \cdot 0 + 0.2 \cdot 0}{1} \\ &= \frac{0.5}{1} \\ &= 0.5\end{aligned}$$

By removing the redundant attribute values, the similarity score does not consider attribute values that would not help a user discriminate between two items. Therefore, the pruned tree 200' yields a more accurate similarity score between two items.

Figure 6:
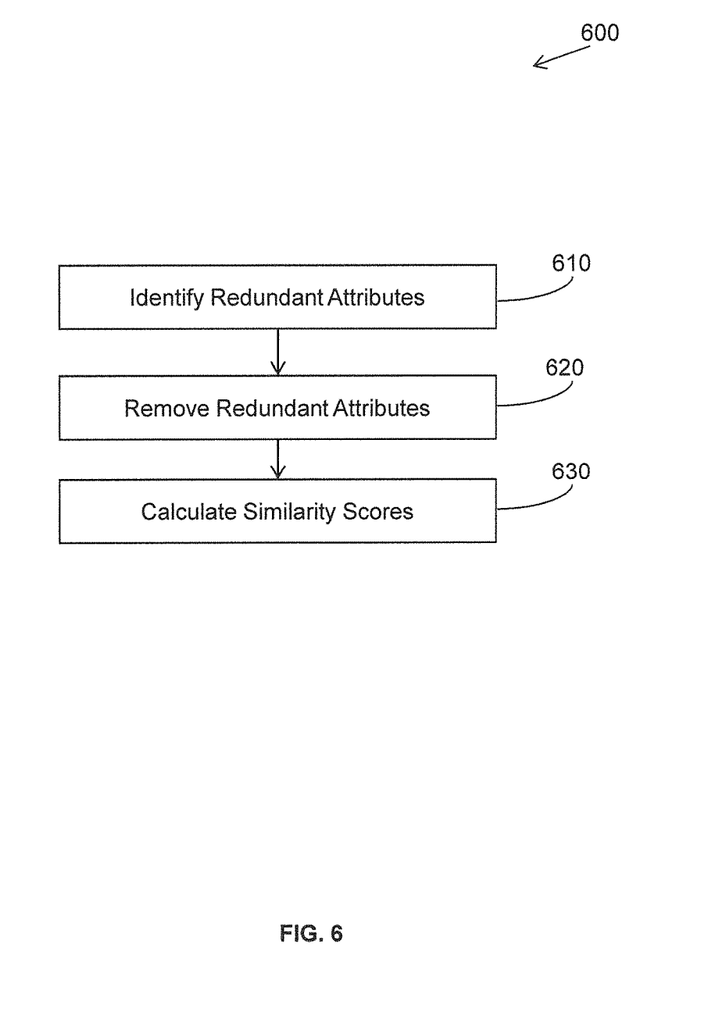
FIG. 6 illustrates an embodiment of a method associated with tree-based attribute redundancy removal.

FIG. 6 illustrates an example embodiment of a method associated with attribute redundancy removal. In some examples such as those described with respect to FIGS. 2, 4 and 5, redundant attribute values are removed by pruning trees. However, the attribute values can be pruned without generating a tree. The tree is merely used as a logical abstraction to better convey the relationships between attributes.

At 610, redundant attribute values are identified from the group of attributes. The group of attributes includes attributes that may be received in any of many formats (e.g., graphical representation, table, index, catalog, list or inventory). The redundant attribute values are identified based on the relationship of the attributes to one another. At 620, the redundant attribute values are removed. For example, a predetermined number of attribute values having the fewest number of relationships to other attribute values may be removed as being insignificant.

At 630, similarity scores are calculated for items represented by the attributes based on the remaining attributes. The removed redundant attributes are not considered in the similarity scores calculated for the item. Accordingly, the determination of how similar items are is not based on superfluous information represented by attributes that have few relationships to the remaining attribute. Consequently, the similarity between items is not overestimated.

Figure 7:
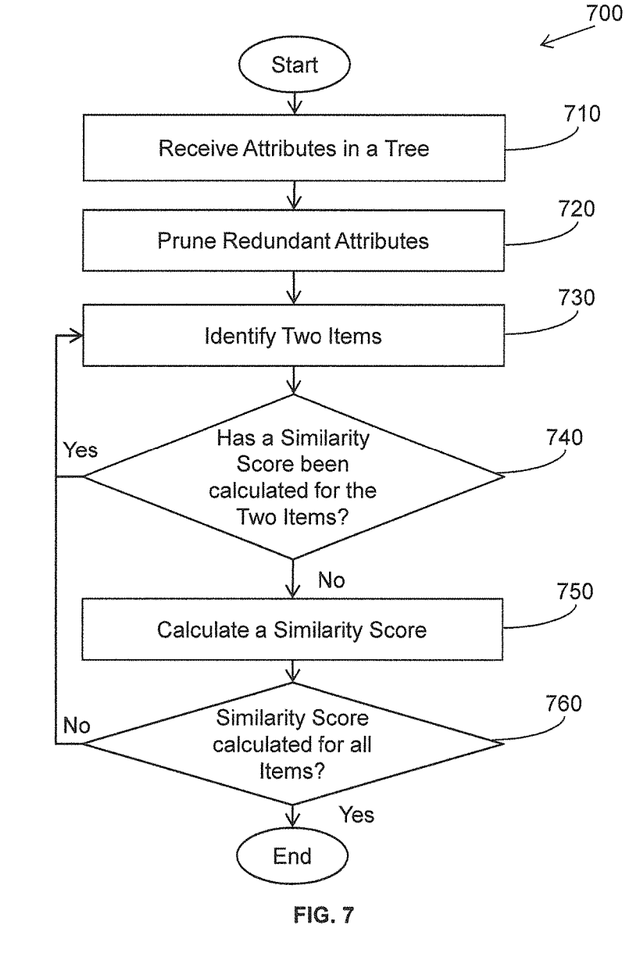
FIG. 7 illustrates an embodiment of an iterative method associated with tree based attribute redundancy removal.

FIG. 7 illustrates another embodiment of a method associated with tree based attribute redundancy removal. At 710, attributes are received in a tree. At 720, attribute values are pruned from the tree in the manner described with respect to FIGS. 1-6. At 730, two items are identified from a set of items in the pruned tree. The items may be identified using the received tree, pruned tree, or alternative resource (e.g., table, index, catalog, stock keeping unit).

At 740, a determination is made whether a similarity score has been calculated for the first item and the second item. If a similarity score has been calculated for the two items, the method 700 returns to 730 to identify two different items from the set of items. If a similarity score has not been calculated for the two items, the method 700 continues to 750 where a similarity score is calculated for the two items.

At 760, a determination has been made whether all combinations of two items from the pruned tree have a corresponding similarity score. If a similarity score has not been calculated for all combinations of items, the method 700 returns to 730 where two more items are identified. If a similarity score has been calculated for all combinations of items, the method 700 ends. The apparatuses and methods described herein determine the similarity between items more accurately because redundant attribute values are not used in the calculation.

Figure 8:
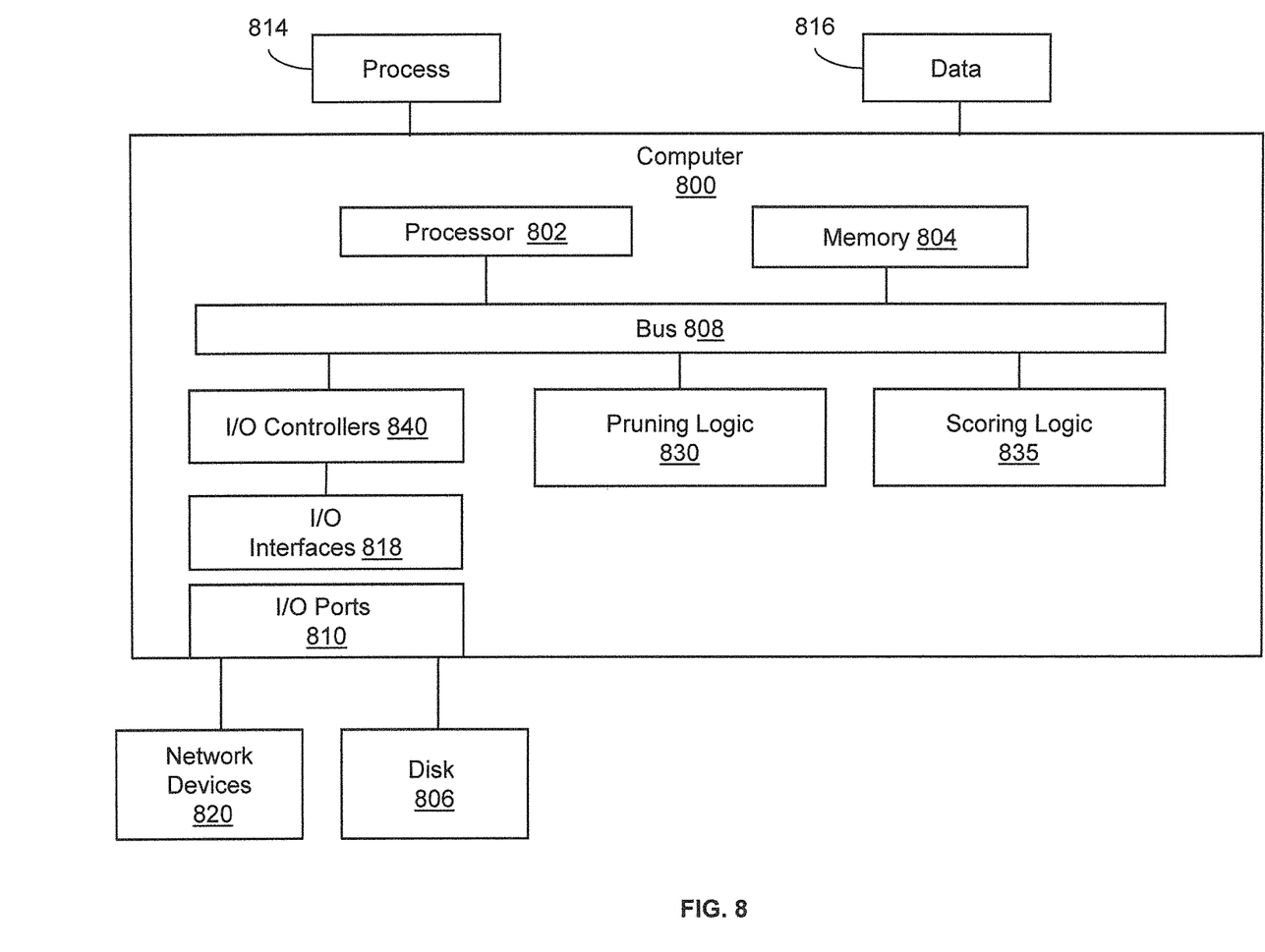
FIG. 8 illustrates an embodiment of a computing system configured with the example systems and/or methods disclosed.

FIG. 8 illustrates an example computing device that is configured and/or programmed with one or more of the example systems and methods described herein, and/or equivalents. The example computing device may be a computer 800 that includes a processor 802, a memory 804, and input/output ports 810 operably connected by a bus 808. In one example, the computer 800 may include pruning logic 830 configured to remove redundant attribute values similar to pruning logic 120 shown in FIG. 1. A scoring logic 835 is configured to calculate a similarity score as described with respect to the scoring logic 130 of FIG. 1. In different examples, the pruning logic 830 and the scoring logic 835 may be implemented in hardware, a non-transitory computer-readable medium with stored instructions, firmware, and/or combinations thereof. While the pruning logic 830 and the scoring logic 835 are illustrated as hardware components attached to the bus 808, it is to be appreciated that in one example, the pruning logic 830 and/or the scoring logic 835 could be implemented in the processor 802.

In one embodiment, pruning logic 830 or the computer is a means (e.g., hardware, non-transitory computer-readable medium, firmware) for identifying and pruning redundant attribute values from a hierarchical representation (e.g., tree) of multiple items. The redundant attribute values are identified as being redundant based on their relationship with other attribute values in the representation. The scoring logic 835 or the computer is a means (e.g., hardware, non-transitory computer-readable medium, firmware) determining the similarity score based on the pruned representation. The pruned representation removes redundant information which protects the similarity score from being arbitrarily inflated. The scoring logic is configured to calculate a similarity score indicative of the degree of similarity between two items.

The means may be implemented, for example, as an ASIC programmed to perform the function of the pruning logic and/or the scoring logic 835. The means may also be implemented as stored computer executable instructions that are presented to computer 800 as data 816 that are temporarily stored in memory 804 and then executed by processor 802.

Pruning logic 830 and/or scoring logic 835 may also provide means (e.g., hardware, non-transitory computer-readable medium that stores executable instructions, firmware) for generating a tree from received attributes, determining how many combinations of items represented by the tree have had similarity scores calculated, or determine a weight for different attributes.

Generally describing an example configuration of the computer 800, the processor 802 may be a variety of various processors including dual microprocessor and other multiprocessor architectures. A memory 804 may include volatile memory and/or non-volatile memory. Non-volatile memory may include, for example, ROM, PROM, and so on. Volatile memory may include, for example, RAM, SRAM, DRAM, and so on.

A storage disk 806 may be operably connected to the computer 800 via, for example, an input/output interface (e.g., card, device) 818 and an input/output port 810. The disk 806 may be, for example, a magnetic disk drive, a solid state disk drive, a floppy disk drive, a tape drive, a Zip drive, a flash memory card, a memory stick, and so on. Furthermore, the disk 806 may be a CD-ROM drive, a CD-R drive, a CD-RW drive, a DVD ROM, and so on. The memory 804 can store a process 814 and/or a data 816, for example. The disk 806 and/or the memory 804 can store an operating system that controls and allocates resources of the computer 800.

The computer 800 may interact with input/output devices via the i/o interfaces 818 and the input/output ports 810. Input/output devices may be, for example, a keyboard, a microphone, a pointing and selection device, cameras, video cards, displays, the disk 806, the network devices 820, and so on. The input/output ports 810 may include, for example, serial ports, parallel ports, and USB ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers. Networks with which the computer 800 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the methods described with respect to FIGS. 1-7.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, is a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. Computer-readable medium described herein are limited to statutory subject matter under 35 U.S.C § 101.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C § 101.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by at least one processor of a computer cause the computer to:

access a tree in a data structure wherein the tree includes attribute values arranged hierarchically in the tree in parent nodes and child nodes, and wherein the attribute values describe features of a plurality of products, and wherein along a branch in the tree from a parent node to a child node, the child node includes an attribute value that describes an attribute value of the parent node;

identify in the tree, a child node that includes a redundant attribute value that does not incrementally differentiate products having the redundant attribute value from products having the attribute value of the parent node at least by calculating, for each of the child nodes, an incremental discriminatory power that quantifies a degree to which each attribute value of the child nodes differentiate a first product from a second product associated with the attribute value of the parent node and comparing the incremental discriminatory power to a redundancy threshold;

prune the tree to remove the child node that includes the redundant attribute value from the parent node to generate a pruned tree, wherein the redundant attribute value from the removed child node is excluded from a similarity score calculation;

calculate a similarity score for two or more products of the plurality of products based, at least in part, on the pruned tree and the attribute values remaining in the pruned tree, wherein calculating the similarity score based on the pruned tree limits an overestimation of a similarity between the two or more products that would result from consideration of the redundant attribute value; and perform a comparison of the similarity score for the two or more products to a similarity threshold, and if the similarity threshold is exceeded by the similarity score for the two or more products, designate at least one of the two or more products as a selected product to be removed an assortment of a store's inventory based on a result of the comparison of the similarity score to the similarity threshold.

2. The non-transitory computer-readable medium of claim 1, wherein the computer-executable instructions for identifying redundant attribute values include instructions that when executed by the at least one processor of the computer cause the computer to: (i) identify each single child attribute value that does not have sibling attribute values as the redundant attribute value, and (ii) remove the single child attribute value from the tree.

3. The non-transitory computer-readable medium of claim 1, wherein the computer-executable instructions that when executed cause the computer to identify redundant attribute values includes instructions that when executed by the at least one processor of the computer cause the computer to identify a parent attribute value having at least two child attribute values, where one child attribute value has fewer instances than remaining child attribute values.

4. The non-transitory computer-readable medium of claim 1, wherein the computer-executable instructions for calculating the similarity score include instructions that when executed by the at least one processor of the computer cause the computer to:
determine a matching coefficient for the two products;
compare the matching coefficient to the similarity threshold; and
determine the two products to be similar when the similarity score exceeds the similarity threshold.

5. The non-transitory computer-readable medium of claim 4, where the matching coefficient is determined based, at least in part, on a matching factor that determines whether the two products have a same attribute.

6. The non-transitory computer-readable medium of claim 5, where the matching factor is multiplied by a weighting coefficient.

7. The non-transitory computer-readable medium of claim 4, wherein the computer-executable instructions for calculating the similarity score for the two products cause the computer to iteratively calculate the similarity score for multiple products.

8. A system, comprising:
tree logic stored in a memory and containing instructions that when executed by a processor cause the processor to (i) read categorized attributes having attribute values for at least two items, (ii) generate a tree in a data structure that hierarchically arranges the attributes in parent nodes and child nodes, (iii) hierarchically arrange the parent nodes higher in the tree than the child nodes, wherein the attribute values describe features of the at least two items;
pruning logic stored in the memory and containing instructions that when executed by the processor cause the processor to (i) calculate, for each of the child nodes, an incremental discriminatory power that quantifies a degree to which each attribute value of the child nodes differentiate a first product from a second product associated with the attribute value of the parent node and compare the incremental discriminatory power to a redundancy threshold, (ii) identify a child node that includes a redundant attribute value that does not incrementally differentiate an item having the redundant attribute value from products having the attribute value of the parent node, and (iii) prune the tree to remove the child node that includes the redundant attribute value from the parent node to generate a pruned tree, wherein
the redundant attribute value from the removed child node is excluded from a similarity score calculation;
a score logic stored in the memory and containing instructions that when executed by the processor cause the processor to calculate a similarity score for the at least two items based, at least in part, on the pruned tree and the attribute values remaining in the pruned tree, wherein calculating the similarity score based on the pruned tree limits an overestimation of a similarity between the at least two items that would result from consideration of the redundant attribute value; and
assortment logic stored in the memory and containing instructions that when executed by the processor cause the processor to performs a comparison of the similarity score for the at least two items to a similarity threshold, and if the similarity threshold is exceeded by the similarity score for the at least two items, designate one or more of the at least two items as a selected item to be removed an assortment of an inventory based on a result of the comparison of the similarity score to the similarity threshold.

9. The system of claim 8, where the pruning logic is configured to prune the redundant attribute value by i) identifying each parent attribute value having a single child attribute value as the redundant attribute value and ii) pruning the single child attribute value as a result of the parent attribute having the single child attribute.

10. The system of claim 8, where the pruning logic is configured to prune the redundant attribute value by i) identifying a parent attribute value having at least two child attribute values, and where one child attribute value has fewer instances than remaining child attribute values in the at least two child attribute values and ii) pruning the child attribute value having fewer values.

11. The system of claim 8, where the pruning logic is configured to prune the redundant attribute value by identifying child attribute values that do not differentiate the at least two items.

12. A method, performed by a computing device including at least a processor and a memory, the method comprising:
accessing a tree in a data structure wherein the tree includes attribute values arranged hierarchically in the tree in parent nodes and child nodes, and wherein the attribute values describe features of a plurality of products, and wherein the child node includes an attribute value that describes an attribute value of the parent node;
identifying a child node that includes a redundant attribute value that does not incrementally differentiate products having the redundant attribute value from products having the attribute value of the parent node at least by calculating, for each of the child nodes, an incremental discriminatory power that quantifies a degree to which each attribute value of the child nodes differentiate a first product from a second product associated with the attribute value of the parent node and comparing the incremental discriminatory power to a redundancy threshold;

pruning the tree to remove the child node that includes the redundant attribute value to generate a pruned tree, wherein the redundant attribute value from the removed child node is excluded from a similarity score calculation;

calculating a similarity score for two or more products of the plurality of products based, at least in part, on the pruned tree and the attribute values remaining in the pruned tree, wherein calculating the similarity score based on the pruned tree limits an overestimation of a similarity between the two or more products that would result from consideration of the redundant attribute value; and performing a comparison of the similarity score for the two or more products to a similarity threshold, and if the similarity threshold is exceeded by the similarity score for the two or more products, designating at least one of the two or more products as a selected product to be removed an assortment of a store's inventory based on a result of the comparison of the similarity score to the similarity threshold.

13. The non-transitory computer-readable medium of claim 12, where identifying the child node that includes the redundant attribute value includes:
identifying relationships between an individual attribute value and remaining attribute values of the attribute values in the tree; and identifying the individual attribute value that has fewer relationships than a relationship threshold.

14. The method of claim 12, where identifying the child node that includes the redundant attribute value includes:
calculating the incremental discriminatory power for each of the child nodes from the attribute value stored in the child node; and comparing the incremental discriminatory power of each child node to a redundancy threshold to determine whether to prune the child node.

15. The method of claim 12, where identifying the child node that includes the redundant attribute value includes identifying a parent attribute value in the tree having at least two child attribute values, where one child attribute value has fewer instances than remaining child attribute values in the at least two child attribute values.

* * * * *

UNITED STATES PATENT AND TRADEMARK OFFICE
CERTIFICATE OF CORRECTION

PATENT NO. : 10,579,602 B2
APPLICATION NO. : 14/068285
DATED : March 3, 2020
INVENTOR(S) : Wang et al.

Page 1 of 1

It is certified that error appears in the above-identified patent and that said Letters Patent is hereby corrected as shown below:

In the Claims

In Column 14, Line 1, in Claim 13, delete "non-transitory computer-readable medium" and insert -- method --, therefor.

Signed and Sealed this
Twenty-seventh Day of October, 2020

Andrei Iancu
*Director of the United States Patent and Trademark Office*